INVENTOR.
JOSEPH S. DiCRISPINO 3,610,032
Patented Oct. 5, 1971

3,610,032
TRIAXIAL STRESS TEST APPARATUS
Joseph S. Di Crispino, 4030 Raleigh Road,
Baltimore, Md. 21208
Filed Feb. 26, 1970, Ser. No. 14,419
Int. Cl. G01n *3/10*
U.S. Cl. 73—88 R                 9 Claims

ABSTRACT OF THE DISCLOSURE

Apparatus for testing spherical tank critical sections exposed to external fluid pressure in which triaxial stresses are induced in full size representative samples of hard structure containments for use in fuel cell applications in deep submergence environments.

---

The invention described herein may be manufactured and used by or for the Government of the United States of America for governmental purposes without the payment of any royalties thereon or therefor.

BACKGROUND OF THE INVENTION

The present invention relates broadly to the testing of structures and, more particularly, is concerned with destructive testing of spherical sections of structural members. More specifically, this invention relates to the testing of a load-bearing spherical section having a minimum critical arc length which simulates the stress levels in a total sphere employed as a hydrostatic pressure-resisting structural component in a deep submergence vehicle.

Considerable interest has been aroused in recent years in particular facets of oceanography as related to deep sea exploration.

Consequently, the investigation and development of new materials and structural designs for deep submersibles is of primary concern in the planning of various oceanographic research projects.

In many situations it is desirable to fabricate undersea containments from relatively high strength materials in order to withstand the hydrostatic pressures encountered at various ocean depths. As research vehicles descend to greater depths, the thickness of the containment materials must be increased since high strength materials have yield strengths which closely approach the ultimate strength of the materials. Moreover, because such high strength materials used for deep submergence equipments are less ductile than conventional hull materials, factors of safety must be accurately determined, since failure modes are generally catastrophic.

In addition to the hydrostatic pressures acting on hull structures, consideration must in certain instances also be given to factors affecting the inside of spherical structures employed particularly as fuel cell containment vessels wherein exposure of the inside surface of the containment to cryogenic reactants or corrosive working fluids will adversely diminish the effective yield strength of a particular structural material.

The term "stress" as used herein is generally meant to include only compressive load forces although under certain operating conditions it is recognized that a particular stressing action might also include tensile, shearing, bending, and torsional forces.

SUMMARY OF THE INVENTION

The general purpose of this invention is to provide an apparatus for testing full size spherical sections, in whatever manner fabricated, of minimum critical arc length, in a manner to simulate stress levels expected to be achieved in total spheres.

To attain this, the present invention provides means for supporting a spherical section in the test apparatus and for introducing fluid under pressure in a chamber adjacent the convex surface of the test specimen.

The apparatus is also provided with an opening to the concave side of the test specimen whereby fuel cell reactants, cryogenic substances or other matter may be added to the inside surface of the specimen so that the effects of containment materials on the specimen at deep submergence conditions can be observed.

OBJECTS OF THE INVENTION

It is a principal object of the instant invention to provide apparatus for destructive testing of structural members.

It is a further object of the instant invention to provide test apparatus wherein the elastic limit of a structural member under test is readily observed during the test.

Still another object of the instant invention is to provide test apparatus wherein a test specimen becomes a permanent visible record of the test.

A still further object of the present invention is to provide an apparatus capable of determining the actual stress at which a test specimen will fail, and accordingly measures the strength of the specimen material.

Another object of the present invention is to provide apparatus for simultaneous testing the internal and external surfaces of a structural specimen.

These and other objects and advantages of the invention will more fully appear from the following description made in connection with the accompanying drawing wherein like reference characters refer to the same or similar parts throughout the several views and in which:

DESCRIPTION OF THE PREFERRED EMBODIMENT

Figure 1:
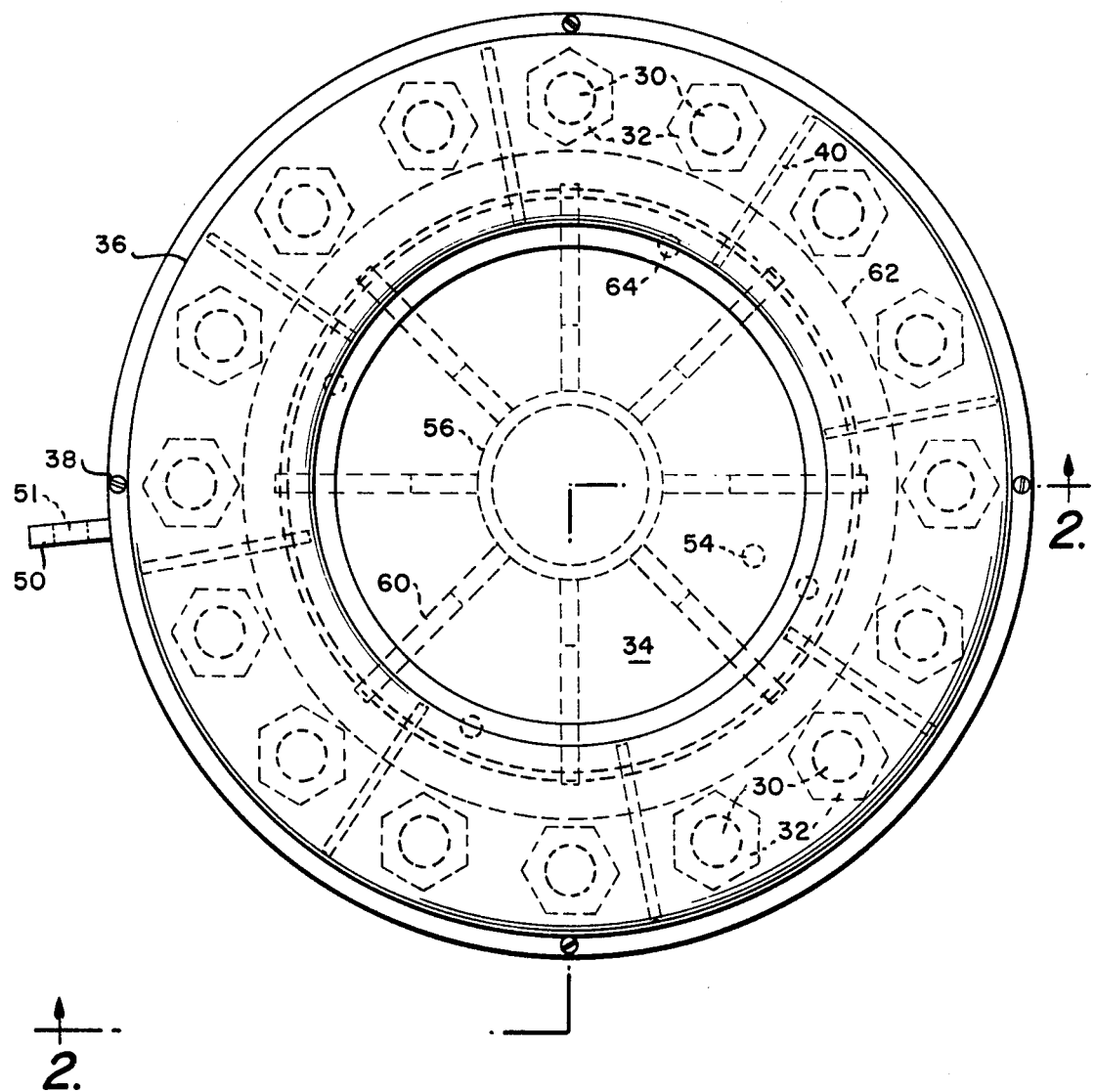
FIG. 1 is a plan view of the test apparatus with the test specimen enclosed.
Figure 2:
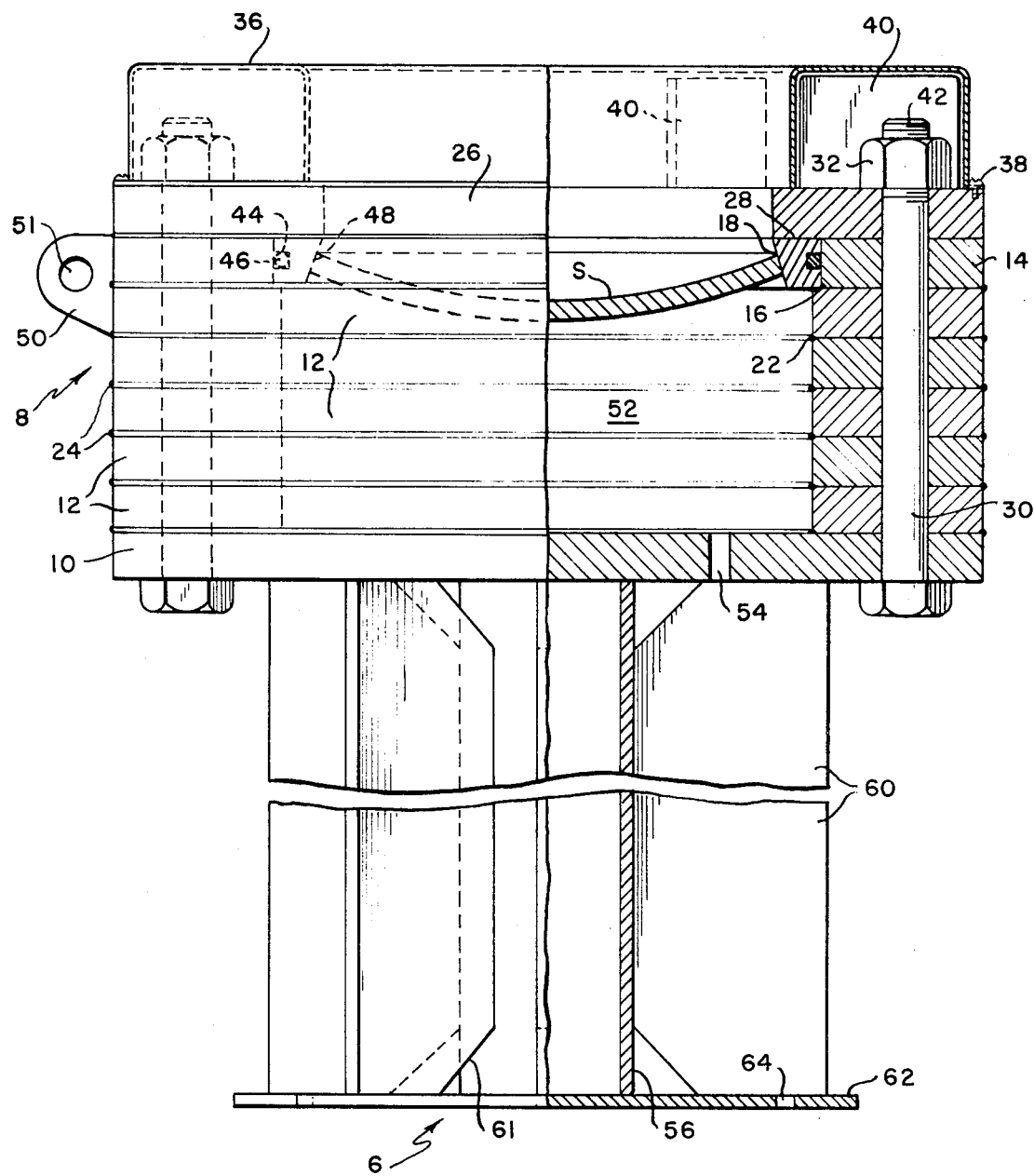
FIG. 2 is a view, partly in section, of the test apparatus showing the spherical test specimen in place.

With continued reference to the drawings, FIGS. 1 and 2 show a cylindrical test apparatus 8 with a spherical test specimen S in place and ready to receive an applied force.

A convenient test apparatus, as shown in FIG. 2, comprises a bottom plate 10, a plurality of retaining rings 12, and a top retaining ring 14.

As observed in FIG. 2, the inside diameter of the ring 14 is slightly larger than that of the retaining rings 12 thereby forming an annular recess 16 which will accommodate a seal ring 18. The seal ring 18 is adapted to secure the specimen S in a manner to be hereinafter described.

Top retaining ring 14, retaining rings 12, and bottom plate 10 are assembled in the manner shown in FIG. 2 and fixed together by welding at interface edge points 22 and 24.

A shear plate ring member 26 is positioned above the top retaining ring 14 in the manner shown in FIG. 2. Plate 26 includes a shoulder portion 28 for engagement with a top surface of the seal ring 18.

In the preferred embodiment, the shear plate member 26 is removably located above the top retaining ring 14 to allow for replacement of spherical specimen S and seal ring 18 as necessary in the operation of the test apparatus. A plurality of bolts 30, having threaded ends 42 and suitable fastening elements 32 engaging threaded ends 42, are employed to securely hold the shear plate ring 26 and seal ring 18 in position on the assembly. The central opening 34 in the shear plate ring 26 permits the introduction of cryogenic substances or corrosive fluids to the inside surface of the test specimen S for purposes as heretofore recited.

A bolt cover 36, fastened by screws 38 to the shear plate ring 26, is provided as a protective device for the protruding portions of the bolts 30 and also to prevent interference with or otherwise restrict an operator's movements around the test apparatus.

Stiffener plates 40 are shown, particularly in FIG. 1, to be located at spaced positions on the shear plate ring 26 between the securing means 32. The stiffener plates are included as reinforcements for the shear ring 26 and additionally serve as supporting elements for the bolt cover 36.

Seal ring 18 is modified by the inclusion of an annular groove 44 provided for the reception of an O ring sealing element 46. In the preferred embodiment of the invention, the O ring material is neoprene with a hardness of 90 Durometer. However, it should be understood that the O ring 46 may be fabricated from any resilient material which will provide effective sealing characteristics in view of the representative pressures to be applied to a particular test specimen.

It should also be understood that the location of the O ring as shown in FIG. 2 is not intended as a limitation on the design of the test apparatus, since the element 46 may be placed, for example, in the seal ring 18 adjacent the shoulder 28 of plate 26 without affecting or otherwise reducing the sealing function of the O ring element.

The test specimen S is shown in FIG. 2 to be in engagement with the seal ring 18 at an inside chamfered face 48 of the seal ring. In practicing the invention, a seal ring 18 and a spherical test specimen S will be provided for each test exercise. The specimen S will be secured to the seal ring in a manner to be hereinafter described.

To permit the test apparatus to be readily transported from one location to another, a lifting pad 50 having a hole 51 is welded to the apparatus 8 at a convenient location on the outside surfaces of retaining rings 12. While only one lifting pad 50 has been shown on the drawings, it may be preferable to include a second pad fixed to the retaining rings 12 at a position on the test apparatus diametrically opposite to the pad 50.

Fluid pressure may be admitted to the cavity 52 of the test apparatus 8 in any convenient manner. In the preferred embodiment, however, an opening 54 has been provided through the bottom plate 10. The opening 54 may be fitted with suitable valving devices (not shown) to control the quantity of fluid admitted. In order to simulate actual operating conditions, the fluid employed will generally be sea water.

Pressure indicating devices (not shown) may also be affixed to the test apparatus in any convenient manner.

The test apparatus 8 is supported by a base structure 6 which is provided to allow access to the bottom plate 10 through which pressure indicating devices or other instrumentation (not shown) may be inserted into the cavity 52.

Base 6 is an open construction comprising a base plate 62, cylindrical center post 56 and, in the embodiment shown in FIGS. 1 and 2, eight support arms 60. In order to reduce the weight of the base structure 6 and to increase the accessability to the bottom plate 10, support arms 60 have been provided with beveled sections 61.

Holes 64 have been included in the base plate 62 to permit the base 6 to be bolted or otherwise secured to a fixed or stable platform (not shown).

To simplify assembly, it is preferred that the components of base 6 be welded together and that the base 6 construction be welded to the bottom plate 10 of the test apparatus 8. However, it is to be understood that other securing devices may be employed in the assembly of the base 6 and, moreover, other forms of supporting constructions may be used without affecting the scope or the operation of the invention as herein disclosed.

Figure 3:
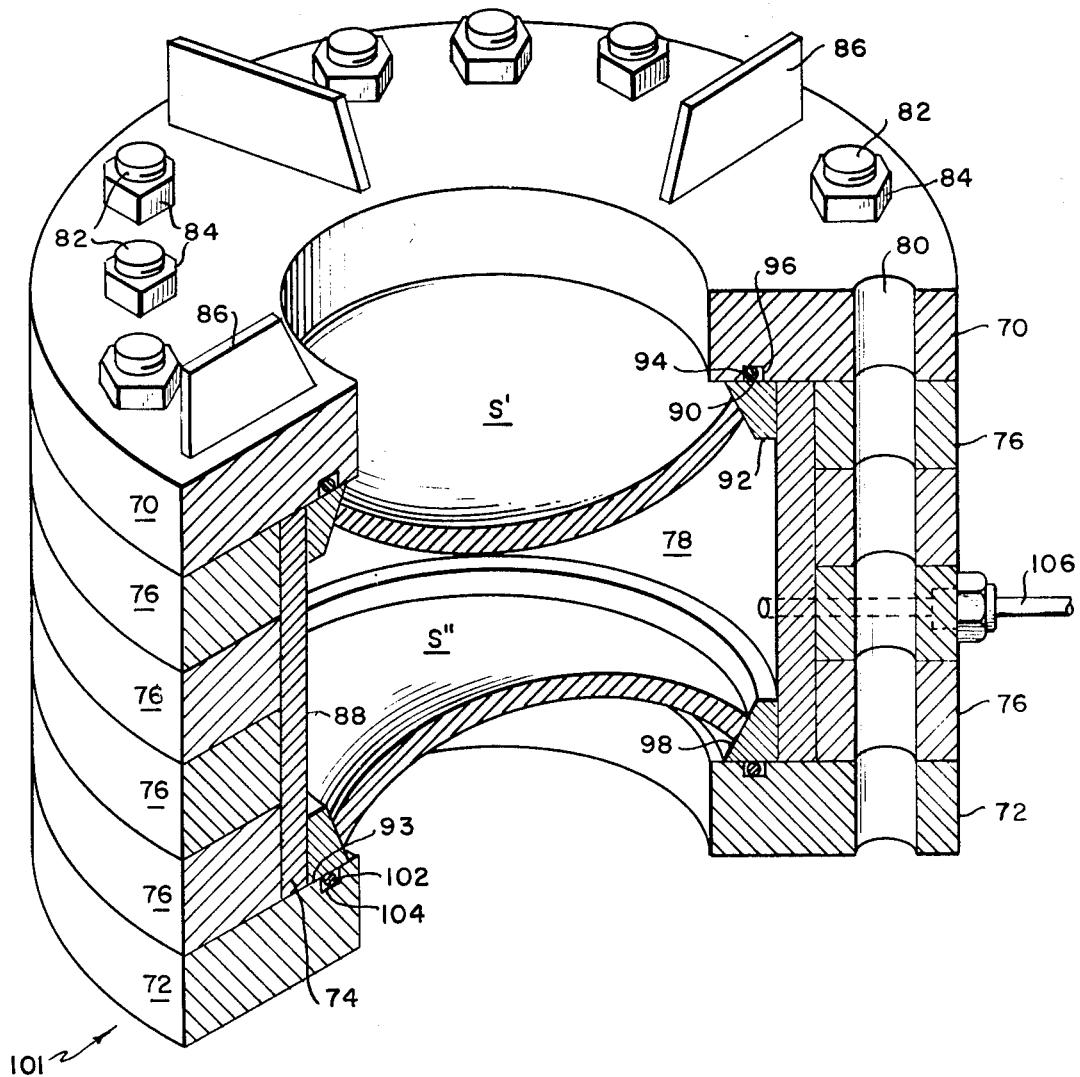
FIG. 3 is an illustration of another embodiment of the invention adapted for testing two spherical test specimens.

Another embodiment of the invention illustrated in FIG. 3 is constructed to permit tests to be carried out on two spherical test specimens S' and S" at the same time and under identical pressure conditions.

The purpose of the embodiment of FIG. 3 is to simultaneously evaluate spherical specimens selected for a single containment cell which is to be designed to have irregular composition characteristics. For example, one test specimen may be included in the test apparatus for weldment studies whereas the other specimen may be subjected to the effects of a corrosive media or a cryogenic liquid for thermal shock evaluation, both specimens being tested under equal pressure conditions.

The test apparatus 101, as shown in FIG. 3, comprises top and bottom shear rings 70 and 72, a retaining sleeve 74, and retaining rings 76.

Retaining sleeve 74 extends longitudinally between the shear rings 70 and 72 and forms the wall 88 of the pressure chamber 78. Retaining rings 76 are concentrically disposed around and in contiguous relationship with the sleeve 74 as shown in FIG. 3 and serve to provide additional support for the sleeve 74 against the high pressure to be encountered within the chamber 78.

The shear rings 70 and 72 and the retaining rings 76 are secured together by a plurality of bolts 82 and nuts 84 of conventional design, inserted through openings 80 in each of the rings.

Spaced upstanding flanges 86 are preferably included as shown in FIG. 3 to reinforce the shear rings.

Spherical specimen S' is positioned within the test apparatus 101 against a seal ring 92 in the same manner as described hereinbefore with reference to the invention embodiment shown in FIGS. 1 and 2.

An O ring sealing element 94 is shown in FIG. 3 to be located within an annular groove 96 provided in the top shear ring 70. When the spherical specimen S' and seal ring 92 are in place, as illustrated in FIG. 3, a surface 90 of the seal ring 92 is in sealing engagement with the O ring seal 94.

Spherical specimen S" is similarly positioned against a seal ring 98 and a surface 93 of the seal ring 98 is located against an O ring sealing element 102. The sealing element 102 is disposed within an annular groove 104 provided in the bottom shear ring 72.

The seal rings 92 and 98 are retained in the positions shown in FIG. 3 by any convenient device. For example, the cylinder 74 may be designed to contain an annular grooved portion (not shown) to accommodate the seal rings 92 and 98 in a manner similar to that shown for the seal ring 28 in FIG. 2. Other well known mechanical expedients, such as screw detents, collars, flanges, and the like for supporting and retaining the rings 92 and 98 at spaced positions within the test apparatus 101 and against respective shear rings 70 and 72 will be obvious to those having ordinary skill in the art. It should be understood, however, that the invention can be practiced without a limitation on the devices for supporting the rings 92 and 98. Accordingly, and for the sake of simplification, no particular supporting or retaining devices have been specifically recited for use with the embodiment illustrated in FIG. 3.

A fluid conduit 106 has been included in the apparatus 101 in the manner shown by FIG. 3 to provide an opening into the chamber 78 for the admission of seawater or other fluid under high pressure. While only one conduit is shown for the embodiment in FIG. 3, it should be understood that other conduits or openings to the chamber 78 could be provided without departing from the spirit of the invention.

The spherical test specimens shown in each of the drawings may be attached to the seal ring members in any convenient manner. It is a preferred practice, however, to secure the spherical specimens to the seal rings by a mechanical process known as lapping. This process involves placing a fine abrasive substance between the adjoining surfaces of the metal elements and grinding the surfaces until a minimum tolerance is obtained between the elements and the adjoining surfaces are substantially identically matched.

In most instances, the spherical specimens will be frictionally retained in the seal ring. If support is necessary, however, small tabs (not shown) on the seal ring may be used to temporarily hold the specimen in place until pressure is applied within the fluid chamber.

It is preferred that the specimen not be permanently fixed to the seal ring since variations in stress may be encountered in that as pressure is applied to the specimen, the fluid chamber becomes diametrically larger. The specimen would, therefore, continually adjust along the chamfered surface of the seal ring and would jamb itself against the seal ring in a manner more nearly simulating actual stress conditions.

Alternatively, the specimens may be affixed to the seal ring by a solid weldment. This alternative method, however, would produce discontinuity stresses in the specimen. Test results obtained from specimens welded to the seal rings would thereafter require mathematical analysis to arrive at actual stress conditions.

The foregoing methods for securing the spherical specimens within the seal ring are in no way exclusive since those familiar with the metal working arts may readily determine that other practices may be devised for assembling the specimens and seal rings than that as has herein been broadly disclosed. Hence, in order to avoid encumbering the disclosure these obvious arrangements have not been presented. It is sufficient to note, however, that whatever assembly practice is employed for producing a specimen and seal ring unit, the edge of a specimen and the abutting surface of a seal ring must conform with one another so as to prevent excessive interfacial slippage.

It will be apparent from the foregoing that the invention provides apparatus of novel and advantageous construction by which spherical specimens of containment cells may be tested expeditiously and the physical properties thereof may be easily observed. The improved apparatus is simple and rugged in construction and may be used repeatedly for testing purposes.

It is to be understood that the invention is not limited to the exact details of construction shown and described, for obvious modifications will occur to persons skilled in the art.

What is claimed is:

1. An apparatus for the destructive testing of spherical section specimens which comprises:
    a cylindrical member having at least one open end;
    said member containing a chamber;
    means disposed within said chamber adjacent said open end for supporting a spherical section in closing relation to said open end, and in such a manner that the convex surface of said section extends towards the interior of said chamber;
    means removably secured to said open end for retaining said supporting means within said chamber; and
    means extending through a wall of said member for admitting a quantity of fluid under pressure into said chamber.

2. The apparatus of claim 1 wherein said cylindrical member comprises:
    a base plate; and
    a plurality of coaxially aligned rings disposed in a columnar arrangement on said base plate thereby forming said chamber.

3. The apparatus of claim 2 wherein: a top ring of said coaxially aligned ring has a greater internal diameter than the remaining plurality of coaxially aligned rings thereby forming an annular recess for seating said supporting means.

4. The apparatus of claim 3 wherein said supporting means comprises:
    a seal ring having an internal surface chamfered at an angle coincident with an edge of said spherical section;
    a circumferential groove formed about said seal ring between said seal ring and said top ring; and
    a resilient seal lying in said groove between said seal ring and said top ring.

5. The apparatus of claim 4 wherein said removable securing means comprises a shear plate overlying said top ring and said seal ring, said plate having a central opening therethrough whereby corrosive or cryogenic substances may be placed on the concaved surface of said spherical section.

6. The apparatus of claim 1 wherein said cylindrical member is open at each end thereof.

7. The apparatus of claim 6 wherein said cylindrical member comprises:
    a plurality of coaxially aligned rings disposed in a columnar arrangement; and
    a sleeve longitudinally disposed within said column of rings and in contiguous relationship to the internal surfaces thereof.

8. The apparatus of claim 7 wherein said removable securing means comprises: shear plates positioned at each end of said column of rings thereby enclosing said sleeve and said supporting means, said shear plates having openings therein whereby failure of a spherical section may be readily observed.

9. The apparatus of claim 8 wherein each of said shear plates includes a circumferential groove formed between a shear plate and said supporting means; and
    a resilient seal lying in said groove between said shear plate and said supporting means.

References Cited
UNITED STATES PATENTS 3,256,069   6/1966   Peterson _____ 20—3 X JERRY W. MYRACLE, Primary Examiner U.S. Cl. X.R.

73—37